US009385565B2

(12) United States Patent
Okada et al.

(10) Patent No.: US 9,385,565 B2
(45) Date of Patent: Jul. 5, 2016

(54) CORE MATERIAL, STATOR CORE, AND MOTOR PROVIDED WITH STATOR CORE

(75) Inventors: Yukihiro Okada, Osaka (JP); Minoru Chamura, Osaka (JP); Yasuji Echizen, Osaka (JP); Tooru Nakamaru, Osaka (JP); Hu Li, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 13/978,852

(22) PCT Filed: Dec. 5, 2011

(86) PCT No.: PCT/JP2011/006783
§ 371 (c)(1),
(2), (4) Date: Jul. 9, 2013

(87) PCT Pub. No.: WO2012/101716
PCT Pub. Date: Aug. 2, 2012

(65) Prior Publication Data
US 2013/0293058 A1 Nov. 7, 2013

(30) Foreign Application Priority Data
Jan. 24, 2011 (JP) ................................. 2011-011655

(51) Int. Cl.
*H02K 1/14* (2006.01)
*H02K 1/12* (2006.01)

(52) U.S. Cl.
CPC . *H02K 1/12* (2013.01); *H02K 1/148* (2013.01)

(58) Field of Classification Search
CPC ................................. H02K 1/12; H02K 1/148
USPC .................................... 310/216.135, 216.009
See application file for complete search history.

(56) References Cited

U.S. PATENT DOCUMENTS 6,630,766 B1 * 10/2003 Kim ....................... H02K 1/148
29/596
6,919,665 B2 * 7/2005 Murakami et al. ..... 310/216.043

FOREIGN PATENT DOCUMENTS

JP 01-264548 A 10/1989
JP 09-308143 A 11/1997
JP 11-289695 A 10/1999

OTHER PUBLICATIONS

Machine Translation, Kozakura, JP 09308143 A, Nov. 28, 1997.*
International Search Report for International Application No. PCT/JP2011/006783, dated Feb. 28, 2012, 1 page.

* cited by examiner

Primary Examiner — Thomas Truong
(74) Attorney, Agent, or Firm — Brinks Gilson & Lione

(57) ABSTRACT

In a core material according to the present invention, a predetermined number of core pieces, each having a tooth portion and a yoke portion, are connected to each other via connecting portions. Each of the connecting portions includes: a V-shaped notch portion; a through hole that is formed at a tapered portion of the notch portion with a diameter elongated in a connection direction; and a thin portion that is formed outside of the through hole and connects the core pieces to each other. The width of the thin portion is more increased apart from the axis of symmetry of two sides constituting the V shape of the notch portion, and further, an intersection between extension lines of the two sides constituting the V shape lies within 0.3 W from the inner side of the thin portion in a notch direction and within the thin portion when W designates the width of the thin portion along the axis of symmetry.

6 Claims, 9 Drawing Sheets

Von Mises
Stress (MPa)

Von Mises
Stress (MPa)

3a  3b

Von Mises
Stress (MPa)

Von Mises
Stress (MPa)

CORE MATERIAL, STATOR CORE, AND MOTOR PROVIDED WITH STATOR CORE

This application is a 371 application of PCT/JP2011/006783 having an international filing date of Dec. 5, 2011, which claims priority to JP2011-011655 filed Jan. 24, 2011, the entire contents of which are incorporated herein by reference.

TECHNICAL FIELD

The present invention relates to a core material for a stator core to be used in a motor such as a brushless motor.

BACKGROUND ART

There has been conventionally known a technique for deforming a core material so as to form a stator core for a motor. In other words, in fabricating this kind of stator core, the yield of a magnetic steel sheet during fabrication is increased by the following technique. First, when a core material is punched from a magnetic steel sheet, not an annular core material but a belt-like core material is punched. At this time, the core material is constituted of a plurality of core pieces continuous to each other in a belt-like manner. The punched core material is deformed into an annular shape, so that a stator core is obtained.

Specifically, a predetermined number of core pieces, each having a tooth portion and a yoke portion, are punched from the magnetic steel sheet in the state in which they are connected to each other via a connecting portion. The connecting portion is plastically deformed to be bent, thereby obtaining an annular stator core. At this time, the connecting portion has a notch portion and a through hole elongated in a connection direction, and therefore, the connecting portion is likely to be plastically deformed (see, for example, PTL 1). Alternatively, the through hole may be formed into a substantially circular shape (see, for example, PTL 2).

FIG. 10 shows the configuration of conventional core material 91 disclosed in PTL 1. As shown in FIG. 10, core material 91 is constituted of a plurality of core pieces 92 connected to each other at thin portion 97 serving as a connecting portion. Core piece 92 includes tooth portion 95 and yoke portion 96. Moreover, core material 91 includes notch portion 93 having joint surfaces 93a and 93b between core pieces 92. At the tip of notch portion 93 is formed expanded through hole 94.

However, with the above-described conventional configuration shown in FIG. 10, through hole 94 is elongated in the connection direction, and further, thin portion 97 is long in the connection direction in parallel to through hole 94. Therefore, when the core material is deformed into an annular shape, thin portion 97 does not have any definite bending center. Thus, when thin portion 97 is plastically deformed to be bent, the bending center cannot be located at the same position at each of the connecting portions according to force exerted on each of yoke portions 96, thereby inducing the fear of mismatch between joint surfaces 93a and 93b of the notch portion 93. In this manner, with the conventional configuration, an inconstant joint state at each of the connecting portions raises the problem of degradation of circularity of a tooth.

In the meantime, with the configuration in which a through hole is formed into a substantially circular shape, as disclosed in PTL 2, the bending center of each of connecting portions is constant, but the region of a thin portion becomes narrow. In view of this, a machining force for forming a core material into an annular shape becomes large, thereby raising problems of an increase in iron loss due to an increase in compressive stress to be exerted on a joint surface and the degradation of motor efficiency caused by the iron loss.

PTL 1: Unexamined Japanese Patent Publication No. H9-308143

PTL 2: Unexamined Japanese Patent Publication No. H11-289695

SUMMARY OF THE INVENTION

A core material according to the present invention includes connecting portions, and a predetermined number of core pieces that each has a tooth portion and a yoke portion, and are connected to each other via the connecting portions to form a stator core by plastically deforming the connecting portions. Each of the connecting portions in the core material according to the present invention includes: a V-shaped notch portion; a through hole formed at a tapered portion of the notch portion with a diameter elongated in a connection direction; and a thin portion formed outside of the through hole and connecting the core pieces to each other. A width of the thin portion becomes larger with increase in distance from an axis of symmetry of two sides constituting the V shape of the notch portion, and further, an intersection between extension lines of the two sides constituting the V shape lies within 0.3 W from an inner side of the thin portion in a notch direction and within the thin portion when W designates the width of the thin portion along the axis of symmetry.

In this manner, during the plastic deformation, a stress is concentrated on a narrowest portion of the thin portion, and then, it serves as a bending center. Hence, the bending centers of the connecting portions substantially accord with each other, thereby achieving the plastic deformation without any mismatch of joint surfaces.

Moreover, the intersection between the extension lines of the two sides of the notch portion lies within 0.3 W from the inner side of the thin portion in the notch direction and within the thin portion, so that the bending center in view of design can substantially accord with the bending center of a magnetic steel sheet during the plastic deformation. In this manner, the joint surfaces of the notch portion can be joined to each other substantially in parallel to each other, thus achieving the plastic deformation by a slight machining force.

In this manner, when the core material according to the present invention is plastically deformed, the joint surfaces can be joined to each other substantially in parallel to each other without any mismatch between the joint surfaces. Therefore, the core material according to the present invention can excellently keep the circularity of the tooth, and further, the core material can be plastically deformed by the slight machining force. Additionally, a compressive stress generated at the joint surfaces can be suppressed, thus suppressing an increase in iron loss so as to enhance the efficiency of a motor.

Furthermore, a stator core according to the present invention is formed of the above-described core material.

In addition, a motor according to the present invention is provided with the above-described stator core.

DETAILED DESCRIPTION OF THE PREFERRED EMBODIMENTS

Hereinafter, exemplary embodiments according to the present invention will be described with reference to the attached drawings. Here, the present invention is not intended to be limited to the exemplary embodiments.

First Exemplary Embodiment

Figure 1:
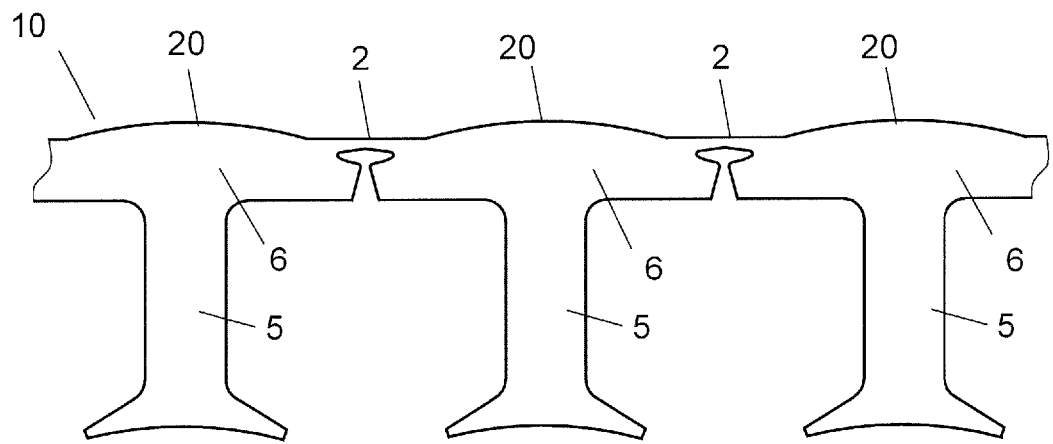
FIG. 1 is a plan view showing a core material in a first exemplary embodiment according to the present invention.

FIG. 1 is a plan view showing core material 10 in a first exemplary embodiment according to the present invention.

As shown in FIG. 1, core material 10 is constituted of a plurality of core pieces 20 that are connected to each other via connecting portion 2. Each of core pieces 20 is constituted of tooth portion 5 and yoke portion 6. Core material 10 is formed by punching a belt-like magnetic steel sheet into a predetermined shape.

In this manner, core material 10 in the present exemplary embodiment includes the plurality of core pieces 20, each having tooth portion 5 and yoke portion 6, connected to each other via connecting portions 2. And then, each of connecting portions 2 in core material 10 is plastically deformed, thereby forming an annular stator core.

Figure 2:
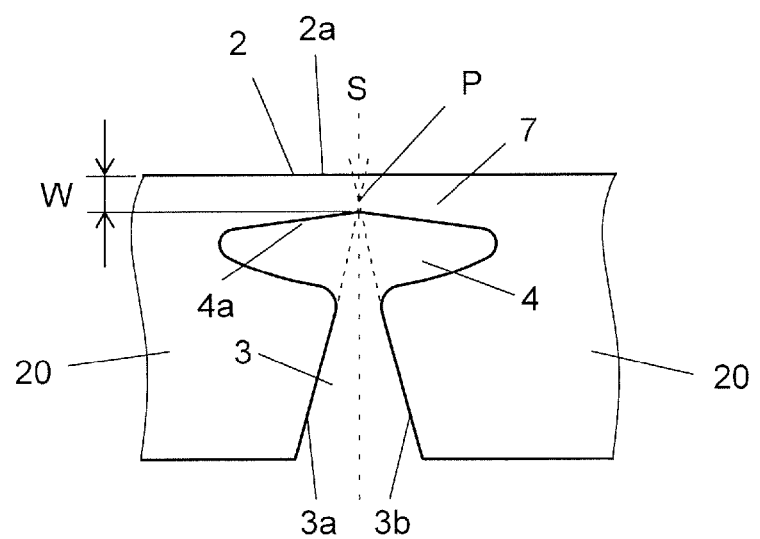
FIG. 2 is a plan view showing the vicinity of a connecting portion of the core material.

FIG. 2 is a plan view showing the vicinity of connecting portion 2 of core material 10 in the first exemplary embodiment according to the present invention.

As shown in FIG. 2, connecting portion 2 is defined between core pieces 20, and includes thin portion 7, notch portion 3, and through hole 4. Core pieces 20 are connected to each other via thin portion 7. Core pieces 20 are arranged in a connection direction via thin portion 7. Moreover, an opening is defined by notch portion 3 and through hole 4 between core pieces 20.

Thin portion 7 has the smallest width at the center thereof in the connection direction, and further, gradually has a greater width toward core piece 20.

Through hole 4 is a hole opened in contact with thin portion 7. Through hole 4 has a hole shape elongated a diameter in the connection direction more than in the notch direction of notch portion 3. In other words, through hole 4 is formed into an elliptic hole shape having both round ends, as shown in FIG. 2. Thin portion 7 is defined by a first longitudinal edge 4a formed of a generally triangular peripheral edge of through hole 4 and a second longitudinal edge 2a formed of the longitudinal side of thin portion 7 opposite to first longitudinal edge 4a.

Notch portion 3 is a notch opened in a V-shaped manner from through hole 4 on a side opposite to thin portion 7 in a direction perpendicular to the connection direction. The opening of through hole 4 and a tapered opening of notch portion 3 are continuous to each other. Notch portion 3 is formed in such a manner as to have an opening width that becomes wider with increase in distance from through hole 4. Two sides constituting the V shape of notch portion 3 have the same length, and further, serve as joint surfaces 3a and 3b that are brought into contact with each other when a stator core is formed.

In this manner, V-shaped notch portion 3 is formed at connecting portion 2 in the present exemplary embodiment; through hole 4 elongated in the connection direction is formed at the tapered portion of V-shaped notch portion 3; and thin portion 7 is disposed outside of through hole 4.

Thin portion 7 of connecting portion 2 of core material 10 is plastically deformed to be bent, thereby forming an annular stator core.

Figure 3:
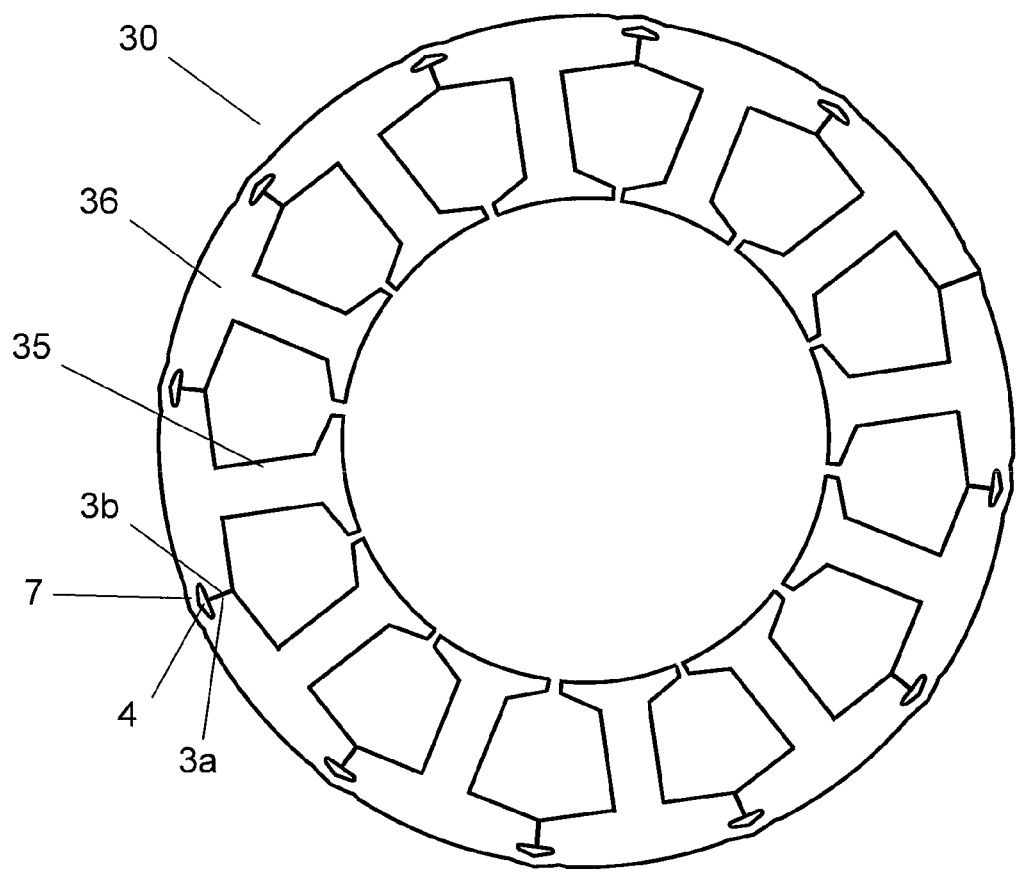
FIG. 3 is a top view showing a configuration of a stator core in the first exemplary embodiment according to the present invention.

FIG. 3 is a top view showing the configuration of stator core 30 in the present exemplary embodiment, such configured as described above. As shown in FIG. 3, in stator core 30, joint surfaces 3a and 3b of core material 10 are brought into contact with each other, thus forming annular yoke 36. A plurality of teeth 35 project from yokes 36 toward an inner circumference in a radial direction.

Next, connecting portion 2 will be described in more details.

First, as shown in FIG. 2, before the plastic deformation, the width of thin portion 7 is set such that the width becomes larger with increase in distance of a connection bi-direction from axis S of symmetry with respect to the two sides constituting the V shape of notch portion 3. In FIG. 2, thin portion 7 has width W on axis S of symmetry. Width W is smallest at thin portion 7. Moreover, intersection P between extension lines of the two sides constituting notch portion 3 is set to lie inside of thin portion 7 in the notch direction, that is, within 0.3 W or less from through hole 4 side, and further, within thin portion 7. In other words, connecting portion 2 is formed such that intersection P is positioned on axis S of symmetry within a range from a boundary point to a point apart from the boundary point by 0.3 W, wherein the boundary point designates the intersection between axis S of symmetry and a boundary line on through hole 4 side of thin portion 7.

Subsequently, a description will be made on comparison between core material 10 such configured as described above and a core material as a comparative example and the comparison result. Here, a core material has a uniform width of a thin portion in the comparative example, and then, it is compared with core material 10 according to the present invention.

Figure 4A:
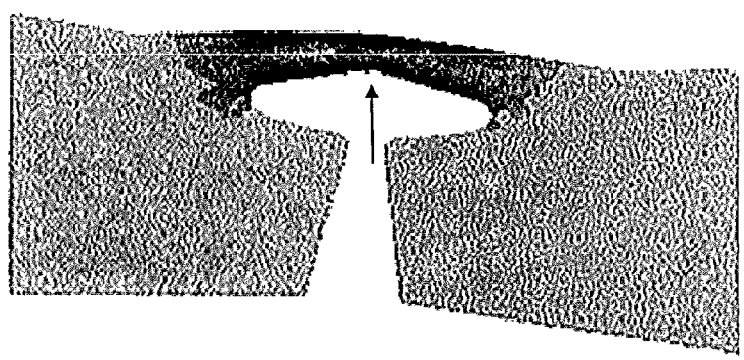
FIG. 4A is a diagram illustrating a stress distribution in the vicinity of a connecting portion at the beginning of bending during plastic deformation according to the present invention.
Figure 4A:
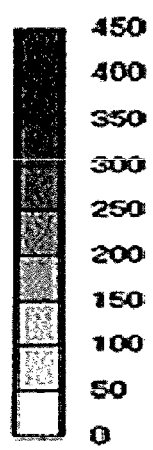
Figure 4B:
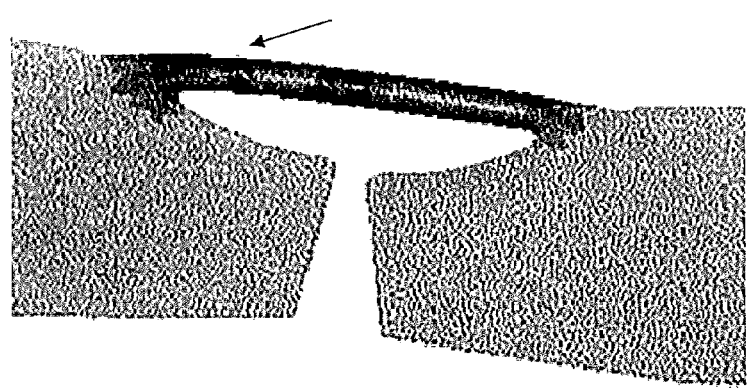
FIG. 4B is a diagram illustrating a stress distribution in the vicinity of a connecting portion at the beginning of bending during plastic deformation in a comparative example.
Figure 4B:
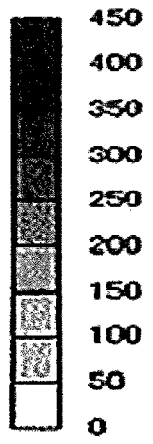
Figure 5A:
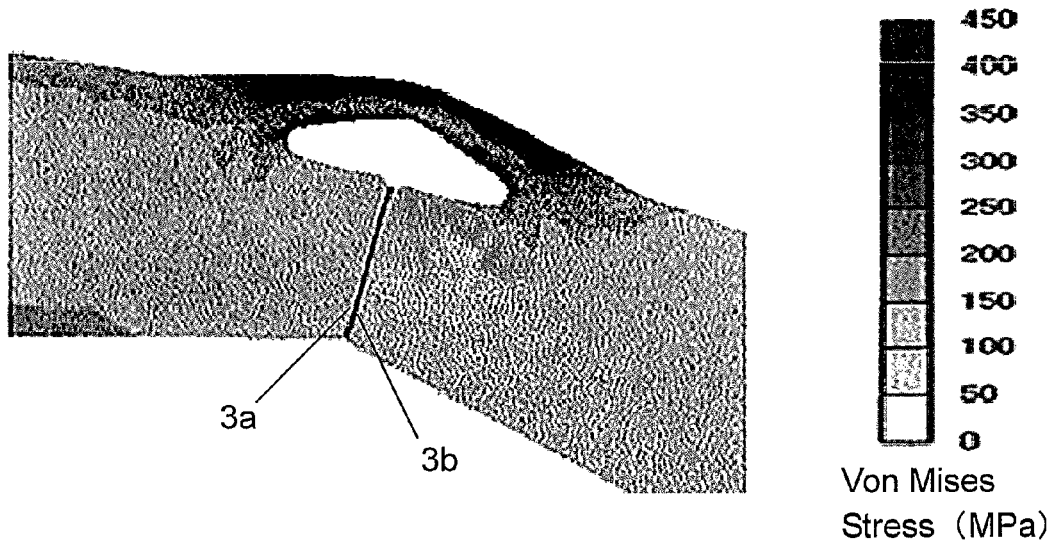
FIG. 5A is a diagram illustrating a stress distribution in the vicinity of the connecting portion during contact according to the present invention.
Figure 5B:
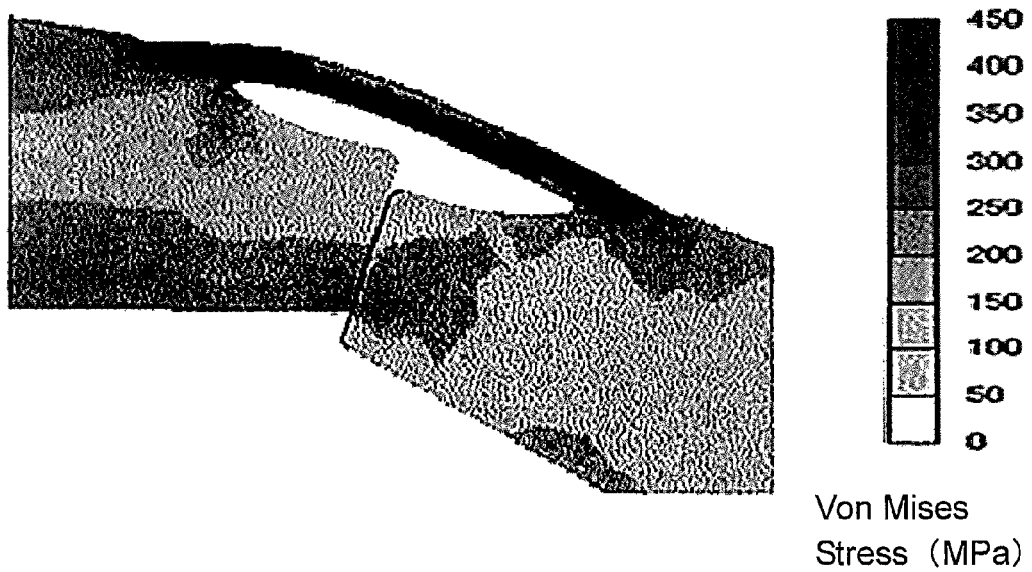
FIG. 5B is a diagram illustrating a stress distribution in the vicinity of the connecting portion during contact in the comparative example.

FIG. 4A and FIG. 4B are diagrams illustrating a stress distribution in the vicinity of the connecting portion at the beginning of bending during the plastic deformation according to the present invention and in the comparative example, respectively. Furthermore, FIG. 5A and FIG. 5B are diagrams illustrating a stress distribution in the vicinity of the connecting portion during contact according to the present invention and in the comparative example, respectively. As for these stress distributions, a von Mises stress is calculated by CAE for a structural analysis.

In FIGS. 4A and 4B, an arrow indicates a portion having the greatest von Mises stress. As shown in FIG. 4B, a stress is not uniformly concentrated according to force exertion at the beginning of bending in the comparative example in which the thin portion has the uniform width, and therefore, the bending center is not stabilized. Therefore, the joint surfaces mismatch each other during the contact, as illustrated in FIG. 5B.

In contrast, the stress is started to be concentrated on a narrowest portion of thin portion 7, and therefore, it serves as a bending center according to the present invention, as illustrated in FIG. 4A. Thus, the bending centers at each connecting portions 2 are substantially the same position. As a consequence, the plastic deformation can be achieved without any mismatch between joint surfaces 3a and 3b, as illustrated in FIG. 5A.

Figure 6:
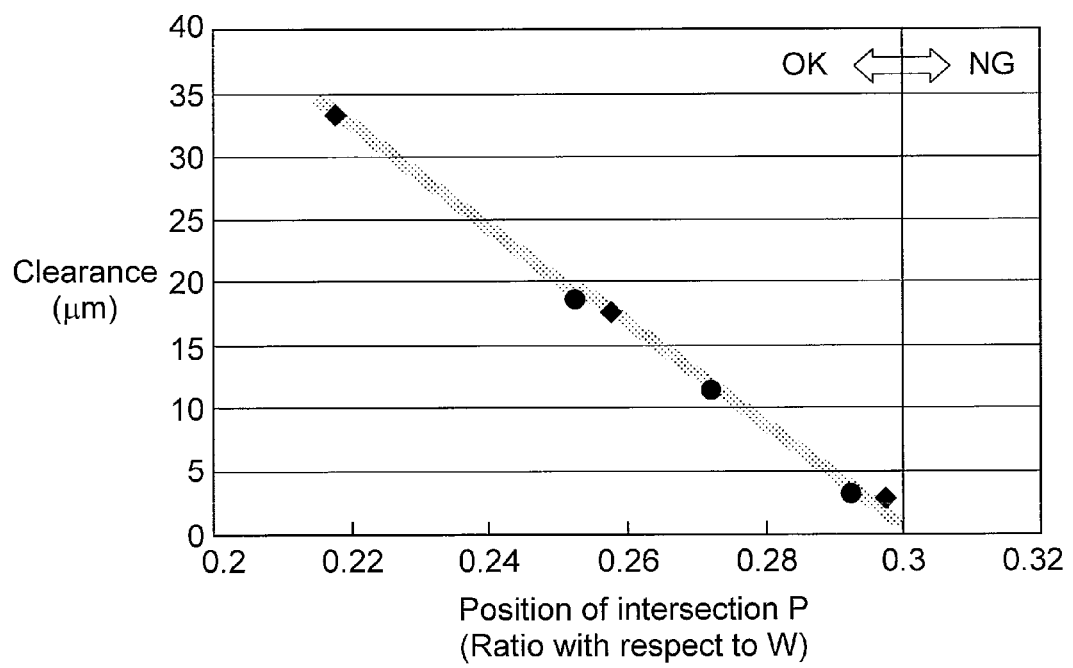
FIG. 6 is a graph illustrating a relationship between a position of intersection P and a clearance defined between joint surfaces.

Intersection P of the extension lines of the two sides constituting the V shape of notch portion 3 is variously changed. With changing intersection P, a clearance defined at the notch portion 3 that is plastically deformed by a predetermined force is calculated by the CAE. FIG. 6 shows the relationship between the position of intersection P and the clearance between the joint surfaces.

In the region in which the position of intersection P is greater than a ratio of 0.3 W from the inner side of thin portion 7 in the notch direction in FIG. 6, the clearance is 0 or less, that is, joint surfaces 3a and 3b of notch portion 3 abut against each other before core material 10 is formed into an annular shape. Therefore, the region is no good (NG) because core material 10 cannot be formed into an annular shape. In contrast, in the region in which the position of intersection P has a ratio of 0.3 W or smaller from the inner side of thin portion 7 in the notch direction, a bending center in view of a design substantially accords with a bending center during the deformation, and therefore, joint surfaces 3a and 3b abut against each other substantially in parallel to each other by a slight machining force. As a consequence, intersection P lies within 0.3 W from the inner side of thin portion 7 in the notch direction and within thin portion 7, so that the bending center in view of the design can substantially accord with a bending center of the magnetic steel sheet during the plastic deformation. In this manner, joint surfaces 3a and 3b of notch portion 3 are joined to each other substantially in parallel to each other, thus achieving the plastic deformation by a slight machining force so as to excellently keep the circularity of the tooth of the resultant stator core. Moreover, a compressive stress generated at the joint surfaces can be suppressed, so that an increase in iron loss can be suppressed, and further, motor efficiency can be enhanced.

Incidentally, although joint surfaces 3a and 3b are brought into close contact with each other in the above exemplary embodiment, a fine clearance may be defined therebetween.

Second Exemplary Embodiment

Figure 7:
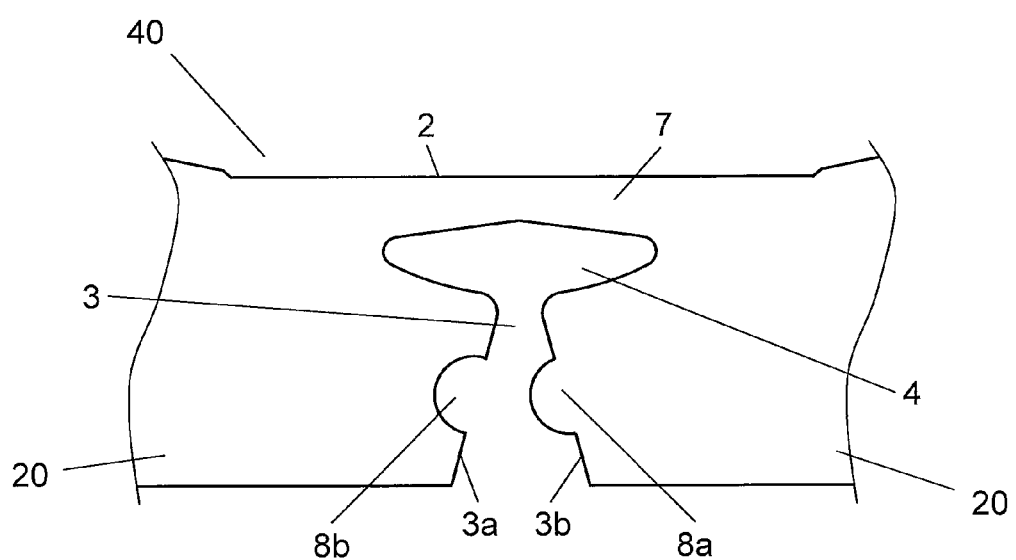
FIG. 7 is a plan view showing the vicinity of a connecting portion of a core material in a second exemplary embodiment according to the present invention.

FIG. 7 is a plan view showing the vicinity of a connecting portion of core material 40 in a second exemplary embodiment according to the present invention.

In FIG. 7, the same constituent elements as those in the first exemplary embodiment shown in FIG. 1 are designated by the same reference numerals, and therefore, their detailed description will be omitted. Core material 40 further includes convex 8a formed on one of joint surfaces 3a and 3b of notch portion 3 and concave 8b formed in the opposite joint surface so as to conform with convex 8a in the present exemplary embodiment in addition to the configuration in the first exemplary embodiment.

A description will be given below in detail of core material 40 such constituted as described above.

First, in forming a stator core, convex 8a and concave 8b are conformed to each other during plastic deformation. And then, all connecting portions 2 are plastically deformed, and thus, the stator core shown in FIG. 3 is formed.

In the present exemplary embodiment, notch portion 3 has the above-described conformable portions formed thereat, and therefore, in the case where force is exerted on the resultant stator core in a radial direction, the conformable portion can receive the radial force. Consequently, deformation caused by external force can be suppressed, and therefore, the circularity of the stator core can be held. Moreover, the contact area between joint surfaces 3a and 3b can be increased, thereby increasing mechanical strength.

As described above, convex 8a is formed at either one of joint surfaces 3a and 3b of notch portion 3 whereas concave 8b is formed at the opposite joint surface in such a manner as to be conformable to convex 8a in the present exemplary embodiment. As a consequence, convex 8a and concave 8b are conformed to each other, thus enhancing the mechanical strength.

Figure 8A:
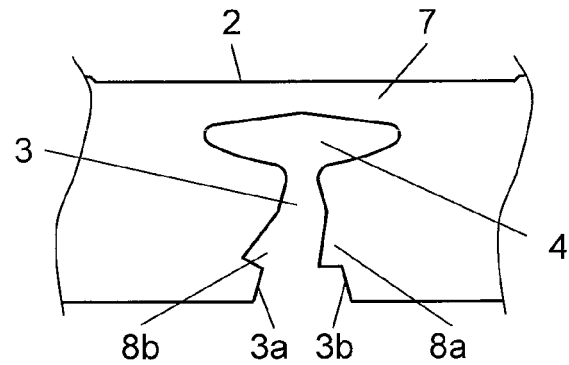
FIG. 8A shows another shape of a projection and a recess at the core material.
Figure 8B:
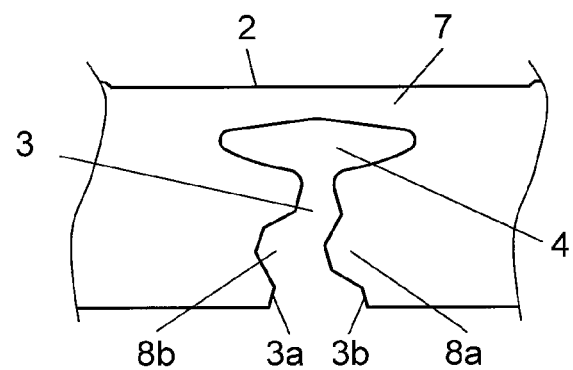
FIG. 8B shows still another shape of the projection and the recess at the core material.
Figure 8C:
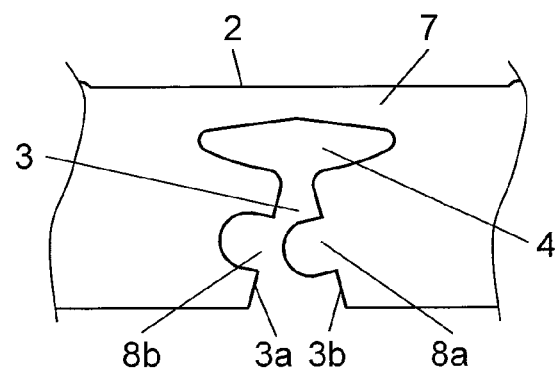
FIG. 8C shows yet another shape of the projection and the recess at the core material.

Incidentally, the shape of each of convex 8a and concave 8b is not limited to the arcuate shape shown in FIG. 7, but it may be polygons shown in FIGS. 8A and 8B or a combination of a polygon and an arc shown in FIG. 8C. They may be formed partly at surfaces 3a and 3b or over entire joint surfaces 3a and 3b.

Third Exemplary Embodiment

Figure 9:
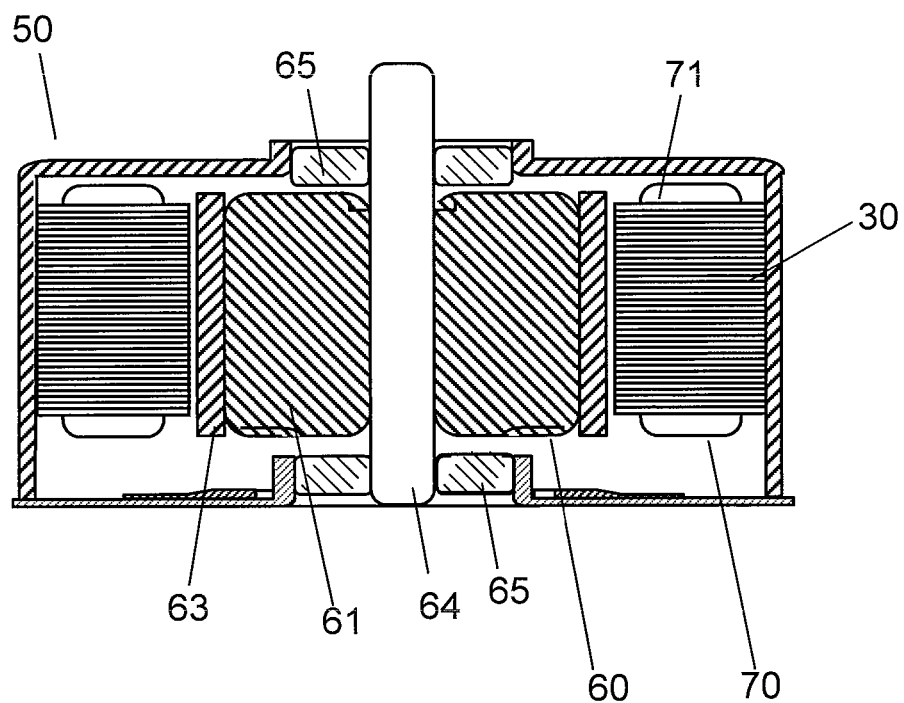
FIG. 9 is a cross-sectional view showing a motor in a third exemplary embodiment according to the present invention.
Figure 10:
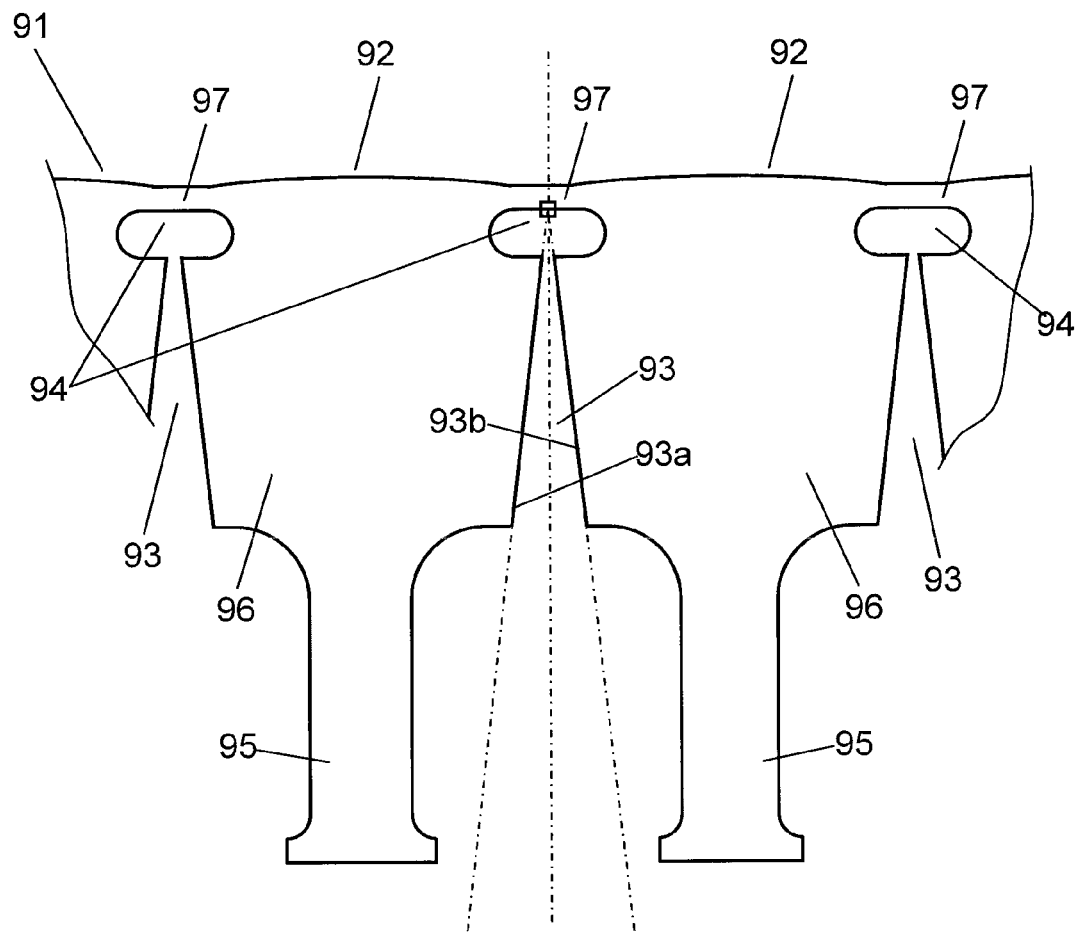
FIG. 10 is a plan view showing a conventional core material.

FIG. 9 is a cross-sectional view showing motor 50 in a third exemplary embodiment according to the present invention.

As shown in FIG. 9, motor 50 in the present exemplary embodiment includes rotor 60 and stator 70. Rotor 60 is rotated about rotary shaft 64 while holding magnet 63 around columnar rotor yoke 61. In stator 70, winding coil 71 is wound around stator core 30.

In rotor 60, rotary shaft 64 is inserted through rotor yoke 61, and further, rotary shaft 64 is securely fixed to rotor yoke 61. Ring-like magnetized magnet 63 is integrally secured around rotor yoke 61. Rotary shaft 64 extending through rotor yoke 61 is inserted through bearings 65, and thus, rotor 60 is rotatably supported by bearings 65.

Moreover, stator 70 is provided with stator cores 30 that have been described in the first or second exemplary embodiment. The present exemplary embodiment exemplifies that a plurality of pieces of stator cores 30 obtained by plastically deforming core materials 10, as described above, are laminated. Winding coil 71 is wound around teeth 35 of stator cores 30.

In this manner, rotor 60 is arranged on the inner circumferential side of stator core 30 in motor 50 such that teeth 35 of stator cores 30 face magnets 63 of rotor 60, respectively.

An AC current is applied to winding coil 71, so that rotor 60 is rotated on rotary shaft 64 in motor 50.

As described above, the connecting portion in the core material according to the present invention is provided with the V-shaped notch portion, the through hole formed at the tapered portion of the notch portion with the diameter elongated in the connection direction, and the thin portion formed outside of the through hole and connecting the core pieces to each other. The width of the thin portion becomes larger with increase in distance from the axis of symmetry of the two sides constituting the V shape of the notch portion, and the intersection between the extension lines of the two sides constituting the V shape lies within 0.3 W from the inner side of the thin portion in the notch direction and within the thin portion when W designates the width of the thin portion along the axis of symmetry.

Consequently, when the core material is plastically deformed, the joint surfaces can be joined to each other substantially in parallel to each other without any mismatch between the joint surfaces. Therefore, the core material can excellently keep the circularity of the tooth, and further, the core material can be plastically deformed by the slight machining force. Additionally, the compressive stress generated at the joint surfaces can be suppressed, thus suppressing an increase in iron loss so as to enhance the efficiency of the motor.

Furthermore, the stator core according to the present invention is formed of the above-described core material. Consequently, the stator core having the excellent circularity can be provided.

In addition, the motor according to the present invention is provided with the above-described stator core. As a consequence, the efficient motor can be provided.

INDUSTRIAL APPLICABILITY

The core material according to the present invention can excellently keep the circularity of the tooth, and further, the plastic deformation can be achieved by the slight machining force. In addition, the suppression of the compressive stress generated at the joint surfaces can suppress an increase in iron loss and enhance the efficiency of the motor. Thus, the core material according to the present invention can be used for various motors, generators, and the like.

The invention claimed is:

1. A core material used to form a stator core, the core material comprising a predetermined number of core pieces each formed in a shape of letter "T" comprising a tooth portion and a yoke portion, the yoke portions being arranged in series along a straight connecting line, two adjacent yoke portions being connected to each other with a connecting portion,
wherein each of the connecting portions includes a center line running perpendicularly to the straight connecting line from a first side of the connecting portion to a second side thereof opposite to the first side, the first side being located on a side of the yoke from which the teeth portion extends, the first and second sides being at least partially coextensive, respectively, with two parallel straight lines both running in parallel with the straight connecting line with a constant distance between the two straight lines, each connecting portion further comprising:
a notch portion formed in the first side of the connecting portion and having two peripheral sides between which the center line runs generally equidistantly, the two peripheral sides being shaped at least in part with a straight line and becoming close to each other as running towards the second side of the connecting portion;
a through hole formed in communication with the notch portion between the second side of the connecting portion and the notch portion, the through hole being in a shape symmetrical with respect to the center line and elongated along the straight connecting line; and
a narrow bridge running along the straight connecting line to connect two adjacent yoke portions, the narrow bridge being symmetrical with respect to the center line and having a first longitudinal edge defining a peripheral edge of the through hole and a second longitudinal edge defining the second side of the connecting portion and running in a straight line manner in parallel with the straight connecting line,
wherein the first longitudinal edge comprises two straight-line segments which extend away from each other in a straight-line manner from the center line and part away at a non-zero angle from the straight connecting line as extending away from the center line, and
wherein a width of the narrow bridge defined between the first and second longitudinal edges has a smallest width of W measured along the center line and becomes larger as getting away from the center line along the straight connecting line, and the narrow bridge has an imaginary point in the center line within the narrow bridge at which extensions of the two peripheral sides of the notch portion intersect, wherein the imaginary point lies on the center line within a range greater than 0 and less than or equal to 0.3 W measured from an intersection of the center line and the first longitudinal edge of the narrow bridge.

2. The core material according to claim 1, wherein a convex is formed on one of the peripheral sides of the notch portion and a concave complementary in shape to the convex is formed in the other thereof.

3. A stator core formed of the core material of claim 2.

4. A motor comprising the stator core of claim 3.

5. A stator core formed of the core material of claim 1.

6. A motor comprising the stator core of claim 5.

* * * * *